Patented July 12, 1932

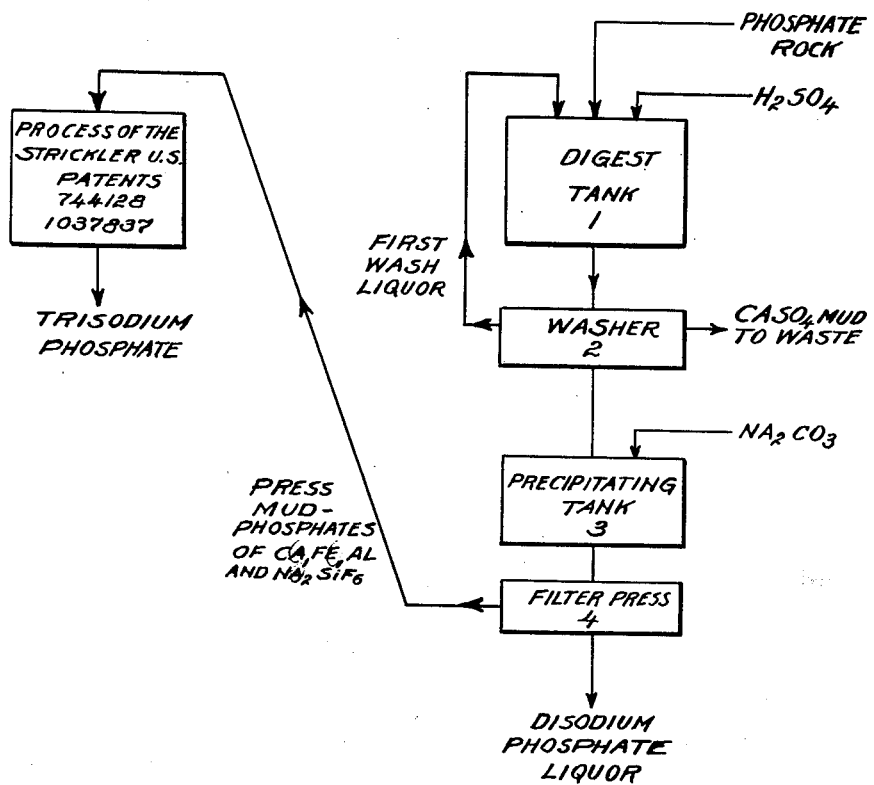

1,866,657

UNITED STATES PATENT OFFICE

CHARLES L. LEVERMORE, OF ROCKVILLE CENTRE, LONG ISLAND, NEW YORK, ASSIGNOR TO GENERAL CHEMICAL COMPANY, OF NEW YORK, N. Y., A CORPORATION OF NEW YORK

MANUFACTURE OF ALKALI METAL PHOSPHATE

Application filed May 7, 1928. Serial No. 275,792.

This invention relates to the production of alkali metal phosphates, and in particular to the production of alkali metal phosphates low in fluorine and sulfate impurities.

In the U. S. patents to Strickler Nos. 744,128 and 1,037,837 are described furnacing processes for the production of tri-alkali phosphate by digesting phosphate rock with nitre cake or sulfuric acid, forming a mix of the digest liquor with alkali sulfate added either as nitre cake (sodium bisulfate) before the digestion or as salt cake (sodium sulfate) after the digestion, and then furnacing the mix of digest liquor containing alkali sulfate in the presence of carbonaceous material to thereby produce tri-alkali phosphate. Since no caustic soda is required for this process, it is the preferred method for the production of trisodium phosphate ($Na_3PO_4$). As disodium phosphate ($Na_2HPO_4$) can be made directly by partial neutralization of phosphoric acid with soda ash and without the use of caustic soda, it has been proposed to prepare the disodium salt directly by digesting phosphate rock with sulfuric acid to produce crude phosphoric acid and then to partially neutralize the phosphoric acid by the addition of sufficient soda ash ($Na_2CO_3$), or caustic soda if desired, to form disodium phosphate. Serious difficulties are encountered in the operation of this latter process, however, in that it is found that a large proportion of the fluorine present in phosphate rock, which ordinarily is as high as 4%, passes through the system into the final product, thereby not only rendering the product unsalable for many uses, but also causing operating troubles in the system such as poor filter pressing, and depression of the crystallizing strength of trisodium phosphate liquor made from the disodium liquor. Moreover, it has heretofore been considered impossible to produce by this process a product low in sodium sulfate, as is specified in certain industries. Furthermore, the yield of phosphate from the process is low due to a substantial loss of phosphate in the form of insoluble phosphates of calcium, iron and aluminum which are precipitated from the phosphoric acid liquor when it is partially neutralized with the alkali to form the disodium phosphate. It is the object of my invention to provide a process practically free of the above operating difficulties and capable of producing an alkali metal phosphate product exceptionally low in fluorine and sulfate impurities, while at the same time obtaining a greatly improved yield of phosphate from the process.

In the accompanying drawing I have diagrammatically illustrated in flow sheet form a system adapted for practicing my invention.

As shown therein, a digest tank 1 is provided into which is introduced a charge of ground phosphate rock, preferably previously calcined to eliminate organic matter. The phosphate rock is essentially calcium phosphate and to decompose this calcium phosphate and liberate phosphoric acid a proportionate amount of sulfuric acid (for example of 66° Bé. strength) is also introduced into the digest tank, the amount of acid preferably being just short of the amount required to combine with all of the calcium of the calcium phosphate. The exact proportion of acid introduced relative to the phosphate rock will vary, of course, depending upon the composition of the rock, but may be easily calculated from an analysis of the rock, as is well understood. The first strong wash water from the subsequent washing operation hereinafter described is also ordinarily returned to the digest tank to thereby recover the soluble phosphate values therein. The mix of rock, acid and wash water is then agitated for a sufficient period of time to effect substantially complete decomposition of the rock, the resultant products being an insoluble precipitate of calcium sulfate and liquor containing essentially phosphoric acid ($H_3PO_4$), no free sulfuric acid, a small amount of soluble monocalcium phosphate ($CaH_4P_2O_8$), and an amount of hydrofluosilicic acid ($H_2SiF_6$) corresponding to that portion of the fluorine in the rock which has passed into and contaminated the liquor.

Due to the use of a slight deficiency of sulfuric acid as above noted, all of the acid will have been utilized in combining with the rock, i. e., all of the $SO_3$ will be present as $CaSO_4$ and none as $H_2SO_4$, and hence the only sulfate in the liquor will be present as soluble $CaSO_4$. Inasmuch as the solubility of calcium sulfate in phosphoric acid is depressed by the presence of mono-calcium phosphate, there will be but a very small amount of calcium sulfate in solution and therefore but a very small total amount of soluble sulfate in the solution. This is of importance in the production of a phosphate product low in sodium sulfate, as will be explained more fully hereinafter.

The precipitated calcium sulfate mud and phosphoric acid liquor are now passed to a washer 2, preferably of the decantation type such as a Dorr thickener, wherein the mud is separated from the liquor and washed as desired. In the ordinary operation of the process the first strong wash water is returned to the digest tank as previously explained, while the separated calcium sulfate mud is discarded to waste.

The phosphoric acid liquor from the washer 2, low in soluble sulfate, is now passed to a precipitating tank 3 wherein it is partially neutralized with an alkali, such as caustic soda (NaOH), caustic potash (KOH), soda ash ($Na_2CO_3$), or potash ($K_2CO_3$) to transform the phosphoric acid into an alkali phosphate, e. g., into disodium phosphate when neutralizing with soda ash or caustic soda. I have stated that the phosphoric acid is "partially" neutralized because it will be observed that in the production of disodium phosphate ($Na_2HPO_4$) only two-thirds of the total amount of alkali which will combine with the phosphoric acid has been added. This neutralizing operation must be very carefully controlled, as hereinafter explained, to secure the full benefit of my invention.

As previously stated, it is highly desirable, if not essential, to produce a final product low in fluorine in order to render the product salable. A large part of the fluorine in the rock has, however, passed into the phosphoric acid liquor principally in the form of hydrofluosilicic acid. Some portion of this hydrofluosilicic acid will be precipitated, chiefly as sodium fluosilicate ($Na_2SiF_6$), when the phosphoric acid liquor is partially neutralized with the alkali to form disodium phosphate. However, as heretofore conducted, this neutralization has been effected by adding sufficient alkali to convert the phosphoric acid to disodium phosphate and have present a small amount of trisodium phosphate ($Na_3PO_4$), i. e., an excess of alkali has been added over that amount required to form disodium phosphate. My investigations have shown that sodium fluosilicate is relatively soluble in liquor containing trisodium phosphate, and this accounts for the incomplete precipitation of fluorine from the phosphate liquor and its consequent retention in the liquor and appearance in the final product.

I have found, however, that if the neutralizing operation is controlled to produce a condition in the liquor after the addition of the alkali which is within the limits of weak acidity to the indicator known as phenolphthalein as the one extreme, and weak alkalinity to the indicator known as methyl orange as the other extreme, that a substantially complete precipitation of the fluorine occurs, principally as sodium fluosilicate, and that this substance is not soluble to any great extent in liquor of this composition, so that a practically complete removal of fluorine from the system can thus be accomplished.

The condition of weak acidity to phenolphthalein corresponds to a composition of the liquor in which almost all of the phosphate is present as disodium phosphate and the remaining small amount as monosodium phosphate ($NaH_2PO_4$), that is, where there is no trisodium phosphate present. The indicator will appear faintly pink at this point. If the proportion of alkali is permitted to become greater so that some trisodium phosphate is present the liquor will react strongly alkaline to phenolphthalein and will exert a strong solvent action upon sodium fluosilicate, thus retaining most of the fluorine in the system. The condition of weak alkalinity to methyl orange corresponds to a composition of the liquor in which almost all of the phosphate is present as monosodium phosphate and the remaining small amount as disodium phosphate, that is, where there is no free phosphoric acid present. The indicator will appear yellow at this point. If the proportion of alkali is permitted to fall below that required to form monosodium phosphate the liquor will react acid to methyl orange and will again exert a strong solvent action upon sodium fluosilicate. Within the range defined by the two conditions of weak acidity to phenolphthalein and weak alkalinity to methyl orange the liquor will, of course, react acid to phenolphthalein and alkaline to methyl orange and will have a composition corresponding to a mixture of disodium phosphate and monosodium phosphate in proportions varying from practically 100% disodium phosphate to 100% monosodium phosphate. Within this range, the solvent action of the liquor upon sodium fluosilicate is quite small, as above stated, and hence a very satisfactory removal of the fluorine can be obtained by maintaining the conditions as noted. The best removal is obtained when the phosphate is present in equimolecular proportions of the mono and disodium forms and the liquor is maintained at a relatively low temperature, for example at approximately 130° F., in order to hold it neutral to litmus.

In the practical operation of my process, inasmuch as the final product desired is disodium phosphate, I prefer to carry the neutralization of the phosphoric acid with alkali as far as possible and yet obtain a high degree of removal of fluorine. Hence I prefer to add sufficient alkali such that the liquor will correspond in composition to disodium phosphate and have present but a small proportion of monosodium phosphate, just sufficient to cause the liquor to react clearly acid to phenolphthalein. In practice I have found a satisfactory condition to be that where 3% of the total $P_2O_5$ present in the liquor is as monosodium phosphate, the remainder being in the form of disodium phosphate.

In conducting the neutralization of the phosphoric acid I prefer to utilize the carbonate of sodium (soda ash) as the source of alkali because of its lower cost compared to the other forms mentioned. When utilizing this substance carbonic acid will be liberated as a result of the reaction between the phosphoric acid and alkali carbonate, and, if permitted to remain in the liquor will cause contamination of the final product with carbonate. Hence the carbonic acid must be eliminated, and this is accomplished by boiling the liquor after the addition of the soda ash for a sufficient period of time to cause elimination of all carbonic acid. This is readily accomplished when the liquor contains a small amount of monosodium phosphate and is hence acid to phenolphthalein. After this operation is complete the liquor should react acid to phenolphthalein and alkaline to methyl orange if the proper amount of soda ash has been added initially, and if it does not, proper correction is made by the addition of small amounts of phosphoric acid or alkali as the case may be. It will be clear, of course, that the step of boiling the liquor to eliminate carbonic acid is not necessary when caustic soda is used as the source of alkali.

When utilizing soda ash as the source of alkali thus necessitating boiling, the resulting liquor will be quite warm, for example about 200° F., but this temperature will not interfere with the purification of the liquor by the precipitation of impurities under the conditions as given. However, if the operation is not conducted according to the preferred procedure given, that is to produce but a small amount of monosodium phosphate in the liquor, but instead is conducted to produce larger amounts of monosodium phosphate in proportion to the amount of disodium phosphate, approaching the condition of equimolecular proportions of the mono and di salts or a greater amount of mono than di, it is desirable to lower the temperature to around 130° F. before completion of the operation in order to obtain the desired degree of precipitation of the impurities.

As previously mentioned, the phosphoric acid liquor introduced into the precipitation tank will contain a small amount of the soluble phosphates of calcium, iron and aluminum, besides hydrofluosilicic acid. These soluble phosphates will be precipitated along with the sodium fluosilicate upon partial neutralization of the acid liquor in the form of insoluble phosphates of calcium, iron and aluminum, the precipitate constituting what is known in this art as "white mud". This precipitate must be separated from the liquor prior to its concentration to crystallize out the disodium phosphate product, and this is accomplished preferably by passing the disodium phosphate liquor and mud to filter presses 4, the resulting filter liquor being practically free of fluorine and very low in other impurities such as soluble sulfate and compounds of calcium, iron and aluminum.

As previously practiced, considerable difficulty was encountered in the filter pressing operation just described, due to the retention in the liquor of sodium fluosilicate, which tended to decompose into sodium fluoride and hydrated silica, the latter causing stoppage of the filters and greatly increasing the cost of the filter pressing operation. This difficulty is eliminated in my process.

The clear disodium phosphate liquor from the filter presses is now treated by well-known methods to recover the final product in whatever form desired, for example, as disodium phosphate by concentrating and crystallizing, or as trisodium phosphate by further neutralization of the liquor and subsequent concentration and crystallization. Ordinarily to obtain disodium phosphate, the liquor is concentrated to crystallizing strength and the disodium phosphate crystallized out, the crystalline product being white and very pure, ordinarily containing less than .02% fluorine. Due to the use of a slight insufficiency of acid in the digestion of the rock, and consequently to the fact that the only soluble sulfate in the phosphoric acid liquor is the very small amount of dissolved calcium sulphate (which is converted to sodium sulphate upon the addition of alkali), there will be but a very small amount of sodium sulfate in the liquor from which the final product is crystallized and hence in the final product. An average analysis of the crystalline disodium phosphate produced by my process will show but .25% sodium sulfate.

The mud from the filter presses 4 consists principally of the phosphates of calcium, iron and aluminum, plus the fluorine eliminated from the system in the form of sodium fluosilicate. This mud has heretofore been discarded as it has not been considered profitable to rework it because of its high content of fluorine, and represents an appreciable loss of phosphate from the system. This loss accounts principally for the poor yield of phosphate previously obtained when operating this type of process.

I have discovered that this mud may be redigested and furnaced according to the processes of the Strickler patents referred to in the first part of this specification, and that by so doing a pure fluorine-free alkali phosphate product is obtained, because of the fact that the fluorine dissolved during the digestion is eliminated during the progress of the furnacing operation of the processes of these patents. Moreover, the iron and some of the aluminum content of the mud taken into solution during the digestion is converted to an insoluble oxide form when the product of the furnace process is dissolved to recover the alkali phosphate, and these impurities are thus to a considerable extent eliminated. The calcium in the mud is, of course, separated as insoluble calcium sulfate. Hence by operating in this manner the phosphate heretofore wasted is recovered as alkali phosphate and at the same time the impurities are readily eliminated from the system.

Accordingly, the filter press mud or filter cake from the disodium phosphate filter presses 4 is puddled with water, wash water from the digest process, or old mother liquor from the crystallizing operation above described, for example from trisodium phosphate, until the hard cake is broken up and then the mix is redigested and furnaced according to the processes of either of Strickler patents referred to, the mud being substituted for the phosphate rock ordinarily treated by these processes. Inasmuch as these processes are fully and clearly described in the patents noted, I will not repeat unnecessary matter here, except to indicate that the essential steps to be performed are to redigest the press mud with sulfuric acid, nitre cake, or a mixture of the two to liberate the phosphate radical ($PO_4$) and precipitate insoluble calcium sulfate, to form a mix of the liberated phosphate radical and alkali sulfate, and then to furnace this mix with carbonaceous material to thereby convert the mix into tri-alkali phosphate, which is then recovered as such. As previously stated the fluorine is completely eliminated during the furnacing operation as volatile hydrogen fluoride and silicon fluoride, which are discharged through the stack of the furnace. The calcium is precipitated as calcium sulfate during the redigestion of the press mud and is thus eliminated, and the iron and some of the aluminum are converted to insoluble oxide forms during the dissolving of the furnace product and to a considerable extent eliminated.

Frequently it will be found desirable to operate my process in conjunction with a previously operating Strickler process, that is, to use my process for the desired production of di-alkali phosphate and the Strickler process for the desired production of tri-alkali phosphate. In this event the filter press mud from my process is simply mixed with the necessary additional amount of phosphate rock to give the required production of tri-alkali phosphate and the mixture digested and furnaced as described.

It will be seen that the process of my invention is not only highly efficient from the standpoint of yield of phosphate but also that it permits the production of an alkali phosphate product very low in undesirable impurities. Moreover, the operating difficulties previously encountered are practically eliminated.

I claim:

1. The process of making alkali phosphate which comprises digesting phosphate rock with sulfuric acid, removing the insoluble calcium sulfate thereby produced, partially neutralizing the residual phosphoric acid liquor by the addition of alkali, thereby precipitating insoluble phosphates and fluorine compounds, separating the mud thereby obtained from the phosphate liquor, redigesting the mud thus separated to liberate the phosphate radical, forming with the liberated phosphate radical a mix with alkali sulfate, and furnacing the mix thereby obtained with carbonaceous material to recover alkali phosphate.

2. The process of making alkali phosphate which comprises digesting phosphate rock with sulfuric acid, removing the insoluble calcium sulfate thereby produced, partially neutralizing the residual phosphoric acid liquor by the addition of alkali to a condition within the limits of weak acidity of the liquor to phenolphthalein and weak alkalinity to methyl orange, thereby precipitating insoluble phosphates and fluorine compounds, separating the mud thereby obtained from the phosphate liquor, redigesting the mud thus separated to liberate the phosphate radical, forming with the liberated phosphate radical a mix with alkali sulfate, and furnacing the mix thereby obtained with carbonaceous material to recover alkali phosphate.

3. The process of making alkali phosphate which comprises digesting phosphate rock with sulfuric acid, removing the insoluble calcium sulfate thereby produced, neutralizing the residual phosphoric acid liquor by the addition of alkali to a condition where the phosphate is present as dialkali phosphate plus a small proportion of monoalkali phosphate, thereby precipitating insoluble phosphates and fluorine compounds, separating the mud thereby obtained from the phosphate liquor, redigesting the mud thus separated to liberate the phosphate radical, forming with the liberated phosphate radical a mix with alkali sulfate, and furnacing the mix thereby obtained with carbonaceous material to recover alkali phosphate.

4. The process of making alkali phosphate which comprises digesting phosphate rock with sulfuric acid, removing the insoluble calcium sulfate thereby produced, partially neutralizing the residual phosphoric acid liquor by the addition of soda ash, the amount of soda ash being such that after the subsequent boiling step the phosphate will be present as disodium phosphate plus a small proportion of monosodium phosphate, thereby precipitating insoluble phosphates and fluorine compounds, boiling the liquor to eliminate carbonic acid, separating the precipitated mud from the phosphate liquor, redigesting the mud thus separated to liberate the phosphate radical, forming with the liberated phosphate a mix with alkali sulfate, and furnacing the mix thereby obtained with carbonaceous material to recover alkali phosphate.

5. The process of making alkali phosphate which comprises digesting phosphate rock with sulfuric acid, removing the insoluble calcium sulfate thereby produced, partially neutralizing the residual phosphoric acid liquor by the addition of soda ash, the amount of soda ash being such that after the subsequent boiling step the liquor will be within the limits of weak acidity to phenolphthalein and weak alkalinity to methyl orange, thereby precipitating insoluble phosphates and fluorine compounds, boiling the liquor to eliminate carbonic acid, separating the precipitated mud from the phosphate liquor, redigesting the mud thus separated to liberate the phosphate radical, forming with the liberated phosphate radical a mix with alkali sulfate, and furnacing the mix thereby obtained with carbonaceous material to recover alkali phosphate.

6. The process of making alkali phosphate which comprises digesting phosphate rock with sulfuric acid, removing the insoluble calcium sulfate thereby produced, partially neutralizing the residual phosphoric acid liquor by the addition of alkali to a condition where the phosphate is present as dialkali phosphate plus a small proportion of monoalkali phosphate, thereby precipitating insoluble phosphates and fluorine compounds, separating the mud thereby obtained from the phosphate liquor, and utilizing the thus purified liquor as a source of phosphate.

7. The process of making alkali phosphate which comprises digesting phosphate rock with an insufficiency of sulfuric acid to combine with all of the available calcium, removing the insoluble calcium sulfate thereby produced, partially neutralizing the residual phosphoric acid liquor by the addition of alkali, thereby precipitating insoluble phosphates and fluorine compounds, separating the mud thereby obtained from the phosphate liquor, redigesting the mud thus separated to liberate the phosphate radical, forming with the liberated phosphate radical a mix with alkali sulfate, and furnacing the mix thereby obtained with carbonaceous material to recover alkali phosphate.

8. The process of making alkali phosphate which comprises digesting phosphate rock with an insufficiency of sulfuric acid to combine with all of the available calcium, removing the insoluble calcium sulfate thereby produced, partially neutralizing the residual phosphoric acid liquor by the addition of alkali to a condition within the limits of weak acidity to phenolphthalein and weak alkalinity to methyl orange, thereby precipitating insoluble phosphates and fluorine compounds, separating the mud thereby obtained from the phosphate liquor, redigesting the mud thus separated to liberate the phosphate radical, forming with the liberated phosphate radical a mix with alkali sulfate, and furnacing the mix thereby obtained with carbonaceous material to recover alkali phosphate.

9. The process of making alkali phosphate which comprises digesting phosphate rock with an insufficiency of sulfuric acid to combine with all of the available calcium, removing the insoluble calcium sulfate thereby produced, partially neutralizing the residual phosphoric acid liquor by the addition of soda ash, the amount of soda ash being such that after boiling to eliminate carbonic acid the liquor will be within the limits of weak acidity to phenolphthalein and weak alkalinity to methyl orange, thereby precipitating insoluble phosphates and fluorine compounds, boiling the liquor to eliminate carbonic acid, separating the precipitated mud from the phosphate liquor, redigesting the mud thus separated to liberate the phosphate radical, forming with the liberated phosphate radical a mix with alkali sulfate, and furnacing the mix thereby obtained with carbonaceous material to recover alkali phosphate.

10. The process of making alkali phosphate which comprises digesting phosphate rock with sulphuric acid, removing the insoluble calcium sulphate thereby produced, partially neutralizing the residual phosphoric acid liquor by the addition of alkali to a condition of weak acidity to phenolphthalein to thereby precipitate insoluble phosphates and fluorine compounds, separating the mud thereby obtained from the phosphate liquor, and utilizing the thus purified liquor as a source of phosphate.

11. The process of making alkali phosphate which comprises digesting phosphate rock with sulphuric acid, removing the insoluble calcium sulphate thereby produced, partially neutralizing the residual phosphoric acid liquor by the addition of alkali to a condition where the predominating phosphate is present as dialkali phosphate and trialkali phosphate is substantially absent to thereby precipitate insoluble phosphates and fluorine compounds, separating the mud thereby obtained from the phosphate liquor, and utilizing the thus purified liquor as a source of phosphate.

12. The process of making alkali phosphate which comprises digesting phosphate rock with an amount of sulfuric acid slightly less than that required to combine with all of the available calcium and thus produce phosphoric acid liquor low in soluble sulfate, removing the insoluble calcium sulfate produced thereby, adding alkali to the liquor whereby alkali phosphate liquor and mud comprising insoluble compounds are formed, separating the mud thereby obtained from the phosphate liquor, re-digesting the mud thus separated to liberate the phosphate radical, forming with the liberated phosphate a mix with alkali sulfate, and furnacing the mix thereby obtained with carbonaceous material to recover alkali phosphate.

13. The process of making alkali phosphate which comprises digesting phosphate rock containing fluorine compounds with an amount of sulfuric acid slightly less than that required to combine with all of the available calcium, removing insoluble calcium sulfate thereby produced, partially neutralizing the residual phosphoric acid liquor by the addition of alkali to a condition within the limits of weak acidity to phenolphthalein and weak alkalinity to methyl orange to thereby precipitate insoluble phosphates and fluorine compounds, separating the mud thereby obtained from the phosphate liquor, re-digesting the mud thus separated to liberate the phosphate radical, forming with the liberated phosphate a mix with alkali sulfate, and furnacing the mix thereby obtained with carbonaceous material to recover alkali phosphate.

14. The process of making alkali phosphate which comprises partially neutralizing crude phosphoric acid by the addition of alkali thereby precipitating mud containing insoluble phosphate compounds, separating the mud thereby obtained from the phosphate liquor, digesting the mud thus separated to liberate the phosphate radical, forming with the liberated phosphate radical a mix with alkali sulfate, and furnacing the mix thereby obtained in the presence of a reducing agent to recover alkali phosphate.

15. In the production of alkali phosphate from crude fluorine-containing phosphoric acid, the improvement which comprises partially neutralizing the phosphoric acid liquor by the addition of alkali to a condition of weak acidity to phenolphthalein to precipitate the insoluble phosphate and fluorine compounds, and separating the insoluble compounds thereby obtained from the phosphate liquor.

16. In the production of alkali phosphate from crude fluorine-containing phosphoric acid, the improvement which comprises partially neutralizing the phosphoric acid liquor by the addition of alkali to a condition where the phosphate is present as dialkali phosphate plus a small portion of monoalkali phosphate, to thereby precipitate the insoluble phosphate and fluorine compounds, and separating the insoluble compounds thereby obtained from the phosphate rock.

17. In the production of alkali phosphate from crude fluorine-containing phosphoric acid, the improvement which comprises partially neutralizing the phosphoric acid liquor by the addition of alkali to a condition where the predominating phosphate is present as dialkali phosphate and trialkali phosphate is substantially absent, to thereby precipitate the insoluble phosphate and fluorine compounds, and separating the insoluble compounds thereby obtained from the phosphate liquor.

In witness whereof I have hereunto set my hand.

CHARLES L. LEVERMORE.